(12) United States Patent
Rosskamp et al.

(10) Patent No.: US 6,415,750 B2
(45) Date of Patent: Jul. 9, 2002

(54) TWO-STROKE ENGINE

(75) Inventors: Heiko Rosskamp, Adelberg; Axel Klimmek, Schwaikheim; Peter Linsbauer, Remshalden; Lars Bergmann, Welzheim, all of (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 09/795,390

(22) Filed: Mar. 1, 2001

(30) Foreign Application Priority Data

Mar. 1, 2000 (DE) .......................................... 100 09 793

(51) Int. Cl.[7] .............................................. F02B 25/20
(52) U.S. Cl. .................................................. 123/73 PP
(58) Field of Search .......................... 123/73 A, 73 PP, 123/73 B, 336, 337

(56) References Cited

U.S. PATENT DOCUMENTS

| | | | | |
|---|---|---|---|---|
| 3,738,336 A | * | 6/1973 | Holland | 123/73 A |
| 4,075,985 A | * | 2/1978 | Iwai | 123/73 A |
| 4,253,433 A | * | 3/1981 | Blair | 123/73 A |
| 5,638,780 A | * | 6/1997 | Duvinage et al. | 123/65 VA |
| 5,870,981 A | * | 2/1999 | Knaus et al. | 123/73 PP |
| 6,152,093 A | * | 11/2000 | Sawada et al. | 123/73 PP |

* cited by examiner

Primary Examiner—Marguerite McMahon
Assistant Examiner—Hyder Ali
(74) Attorney, Agent, or Firm—Walter Ottesen (57) ABSTRACT

A two-stroke engine for a portable two-stroke engine in a portable handheld work apparatus includes a combustion chamber (3) formed in a cylinder (2). The combustion chamber (3) is delimited by the piston (5) which drives the crankshaft (7) via a connecting rod (6). The two-stroke engine includes several transfer channels (14), which, referred to a symmetry plane (49), lie on opposite sides (47, 48) with the plane partitioning approximately the outlet (10). The transfer channels (14) connect the crankcase (4) to the combustion chamber (3). A first end (20) of each transfer channel (14) opens via an entry window (12, 15) into the combustion chamber (3) and the second end (19) of each transfer channel opens to the crankcase (4). Each transfer channel (14) is connected, between its ends (19, 20), to an air channel (22a, 22b) via a membrane valve (21). Air is supplied by the air channel (22a, 22b) via an adjustable throttle (31, 32).

16 Claims, 4 Drawing Sheets

TWO-STROKE ENGINE

FIELD OF THE INVENTION

The invention relates to a two-stroke engine as used, especially, as a drive engine in a portable handheld work apparatus such as a motor-driven chain saw, brushcutter, cutoff machine, blower apparatus or the like.

BACKGROUND OF THE INVENTION

Mixture-scavenged two-stroke engines are used especially in portable handheld work apparatus because of the low weight and high power realization. In order to improve the exhaust-gas performance of mixture-scavenged two-stroke engines, German patent publication 2,650,834 discloses, in the context of a four-stroke engine, supplying essentially fuel-free gas (preferably air) via the transfer channels disposed close to the outlet and to introduce a rich mixture via the transfer channels which are remote from the outlet. Here air is already present ahead of the rich mixture in the transfer channels remote from the outlet. In this way, the mixture scavenging losses are intended to be reduced and therefore the exhaust-gas quality improved.

Supplied fuel-free gas, especially air, is not advantageous in all operating states for reducing scavenging losses. Thus, in the case of idle, an adequately rich ignition-ready mixture has to be provided in the combustion chamber; whereas, in high rpm ranges, a slightly lean mixture is advantageous. Furthermore, there is only a narrow window of time available for introducing the mixture at high engine speed which, in the case of advanced air, is further limited. In German patent publication 2,650,834, a throttle flap is suggested in the gas supplying air channel to adjust the quantity of the advanced air in the transfer channel remote from the outlet.

SUMMARY OF THE INVENTION

It is an object of the invention to improve a two-stroke engine to achieve a complete introduction of mixture at reduced scavenging losses independently of the charging principle at every operating point of the engine.

The two-stroke engine of the invention includes a two-stroke engine in a portable handheld work apparatus. The two-stroke engine includes: a cylinder having a cylinder wall; a piston mounted in the cylinder to undergo a reciprocating movement along a stroke path between top dead center and bottom dead center during operation of the engine; the cylinder and the piston conjointly delimiting a combustion chamber; a crankcase connected to the cylinder; a crankshaft rotatably mounted in the crankcase; a connecting rod connecting the piston to the crankshaft to permit the piston to drive the crankshaft as the piston reciprocates in the cylinder; a mixture-preparation device for supplying an air/fuel mixture; an intake channel for conducting the air/fuel mixture into the crankcase; the cylinder having a discharge opening formed therein; a plurality of transfer channels connecting the crankcase to the combustion chamber; a first portion of the transfer channels being disposed on one side of a symmetry plane extending through the cylinder so as to partition the discharge outlet; a second portion of the transfer channels disposed on the other side of the symmetry plane; each of the transfer channels having a first end defining an entry window opening into the combustion chamber; the entry window being formed in the cylinder wall and being controlled by the piston as the piston moves in the cylinder; each of the transfer channels having a second end opening into the crankcase; a first plurality of air channels connected to corresponding ones of the first portion of transfer channels; a second plurality of air channels connected to corresponding ones of the second portion of the transfer channels; gas supply means for supplying a gas flow to each of the air channels; the first plurality of air channels being configured separately from each other so that the volumes of the gas flows thereto can be adjusted differently; the second plurality of air channels being configured separately from each other so that the volumes of the gas flows thereto can be adjusted differently; a check valve for connecting each of the air channels to the transfer channel corresponding thereto at a location between the first and second ends thereof so as to permit the gas flow to flow from the air channel into the transfer channel; and, a throttle device connected to the air channels for effecting the different adjustment of the volumes of the gas flows in the separately configured air channels.

Each transfer channel on a side of the symmetry plane is connected to a gas supplying air channel. The gas supplying channels are configured so that they are substantially separate from each other. In this way, it is possible to adjust the volumes of the gas flows in the air channels independently of each other so that the quantity and the distribution of the air, which is introduced ahead of the air/fuel mixture to reduce the mixture scavenging losses, can be metered so as to be adapted to the operating state of the engine.

For a two-stroke engine having (n) transfer channels ($n \geq 3$), this makes possible the metering of the bypass air for reducing the mixture scavenging losses with this metering of the bypass air being adapted to an operating point of the engine. In this connection, the engine can be operated over a wide range in accordance with the stratified charge principle as well as in accordance with the principle of advanced air in the transfer channels close to the outlet as well as in the transfer channels remote from the outlet with an appropriate control of the gas-supplying air channels.

In the principle of advanced air, a volume of air is advanced into the transfer channel ahead of the air/fuel mixture thereby facilitating scavenging of the combustion chamber in advance of the next combustion. This reduces the amount of uncombusted fuel discharged to the atmosphere. More specifically, little of the air/fuel mixture which follows the advanced air is discharged because the discharge outlet is already almost closed or closed by the time that the air/fuel mixture reaches the combustion chamber behind the scavenging volume of air.

Advantageously, each air channel is assigned a preferably adjustable throttle. To reduce the need of components, a common adjustable throttle is assigned to the transfer pair of the overflow channels which lie approximately at the same elevation and are on opposite-lying sides of a plane of symmetry of the cylinder. The throttle is configured like an air throttle in a membrane carburetor and therefore has a throttle flap or cylinder which can be adjusted in a simple manner for controlling the volume flow. Here, it is advantageous that the throttle element of an air channel is position-dependently coupled to the throttle flap of the mixture-preparation device. This position-dependent coupling can be linear but can also be configured to be adapted to a curve, for example, progressively opening and can also include lost motion in order to make possible a time-dependent delayed opening of the air throttle element with reference to the carburetor throttle flap. This is achieved in a simple manner with the configuration of actuating arms or cam discs which connect the throttle flap levers of the various throttle flaps to each other. The coupling function is determined by the form and length of the actuating arms and cam discs. It is practical to be able to adjust the lengths of the actuating arms.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
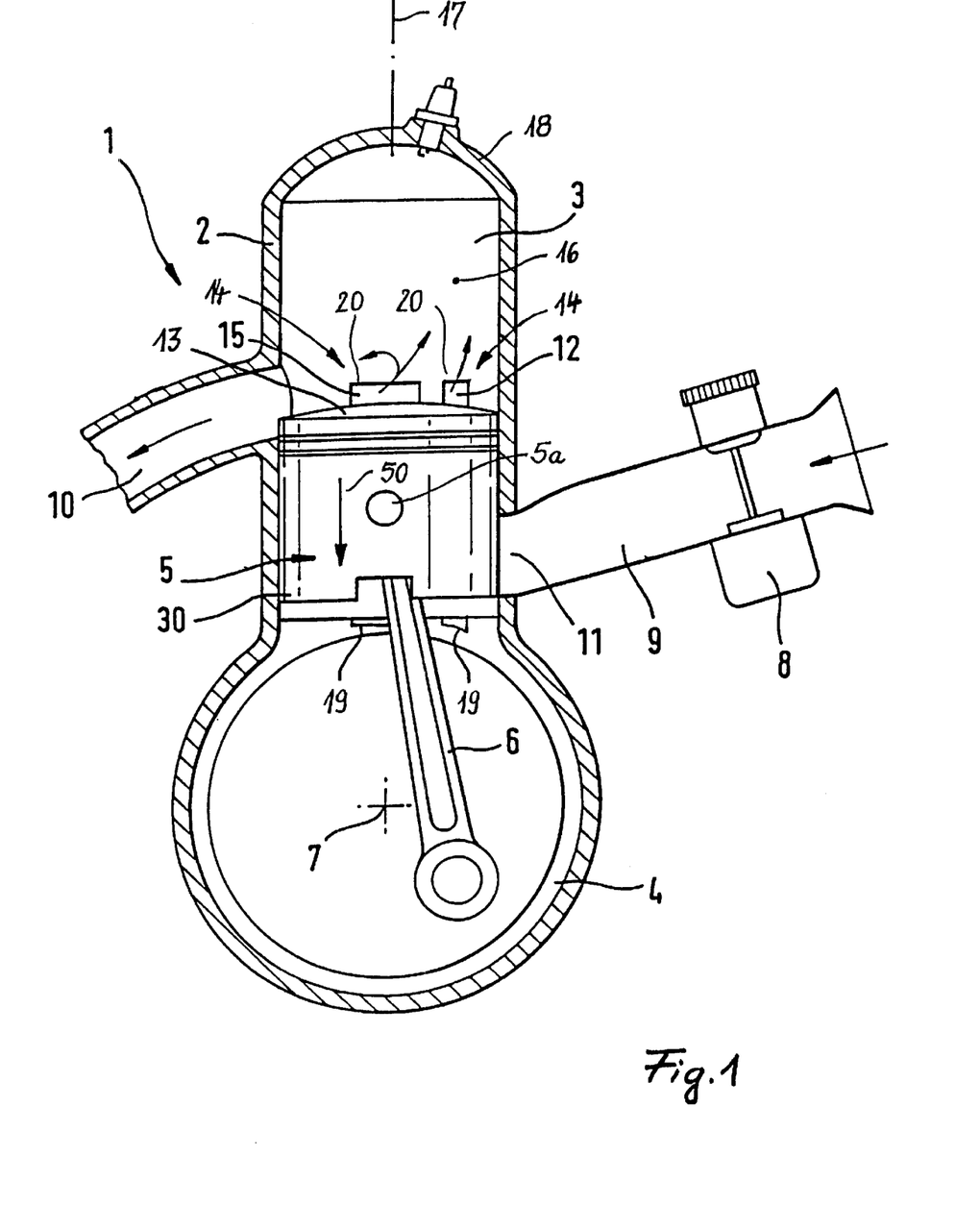
FIG. 1 is a side elevation view, partially in section, of a two-stroke engine having transfer channels lying on opposite sides of the cylinder.

The two-stroke engine 1 shown in FIG. 1 includes essentially a cylinder 2 and a piston 5 movable up and down in the cylinder. The piston 5 imparts rotational movement to a crankshaft 7 via a connecting rod 6. The crankshaft 7 is arranged in the crankcase 4. The piston 5 is held at the end of the connecting rod 6 by a piston bolt 5a to facilitate pivotal movement of the connecting rod.

A combustion chamber 3 is formed in the cylinder 2 and this chamber is delimited by the base 13 of the piston 5. The combustion chamber 3 includes an outlet 10 through which the combustion gases are directed away after a work stroke. The air/fuel mixture, which is needed to operate the engine 1, is supplied to the crankcase 4 from a mixture-preparation device 8 via an inlet 11 and an intake channel 9 which is connected to the inlet 11. The mixture-preparation device 8 is preferably a membrane carburetor.

In the embodiment shown, the inlet 11 is slot-controlled by the wall surface 30 of the piston 5. In the start position of the piston 5 shown in FIG. 1, the inlet 11 is completely closed by the wall surface 30. The configuration of the inlet 11 can preferably be as a membrane inlet. The air/fuel mixture, which is already drawn into the crankcase 4, is therefore compressed with a further movement of the piston 5 in the direction of arrow 50 toward bottom dead center and flows into the combustion chamber via transfer channels 14 of which one is shown in section in FIG. 3.

Figure 2:
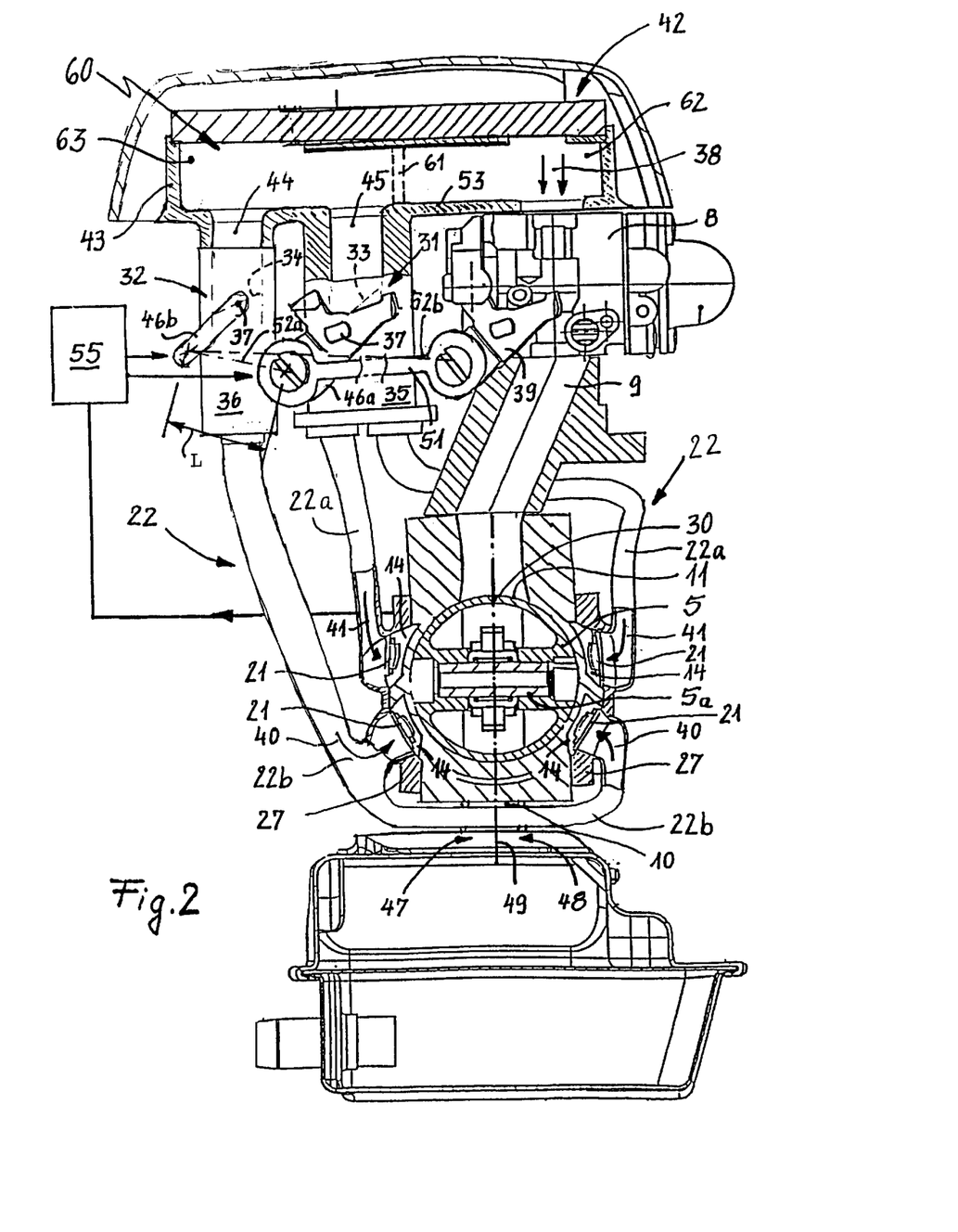
FIG. 2 is a section view taken through a cylinder of a two-stroke engine having an air filter mounted thereon and an exhaust-gas muffler.

As shown in FIGS. 1 and 2, two transfer channels 14 are arranged in the embodiment on each side of a symmetry plane 49 of the cylinder 2. The symmetry plane 49 includes the cylinder axis 17 and partitions the outlet 10, that is, the outlet window. The number of transfer channels 14 is given here only by way of example; n-channels (n≧3) are possible.

The first end 20 of a transfer channel 14 lies opposite the cylinder head 18 and opens into the combustion chamber 3 via an entry window 12 or 15 in the cylinder wall 16; whereas, the second end 19 of each transfer channel 14 faces toward the crankcase 4 and opens thereto. As shown in FIG. 1, the entry window 15 is assigned to the two channels 14 close to the outlet 10 and the entry window 12 is assigned to the two channels 14 remote from the outlet 10.

Figure 3:
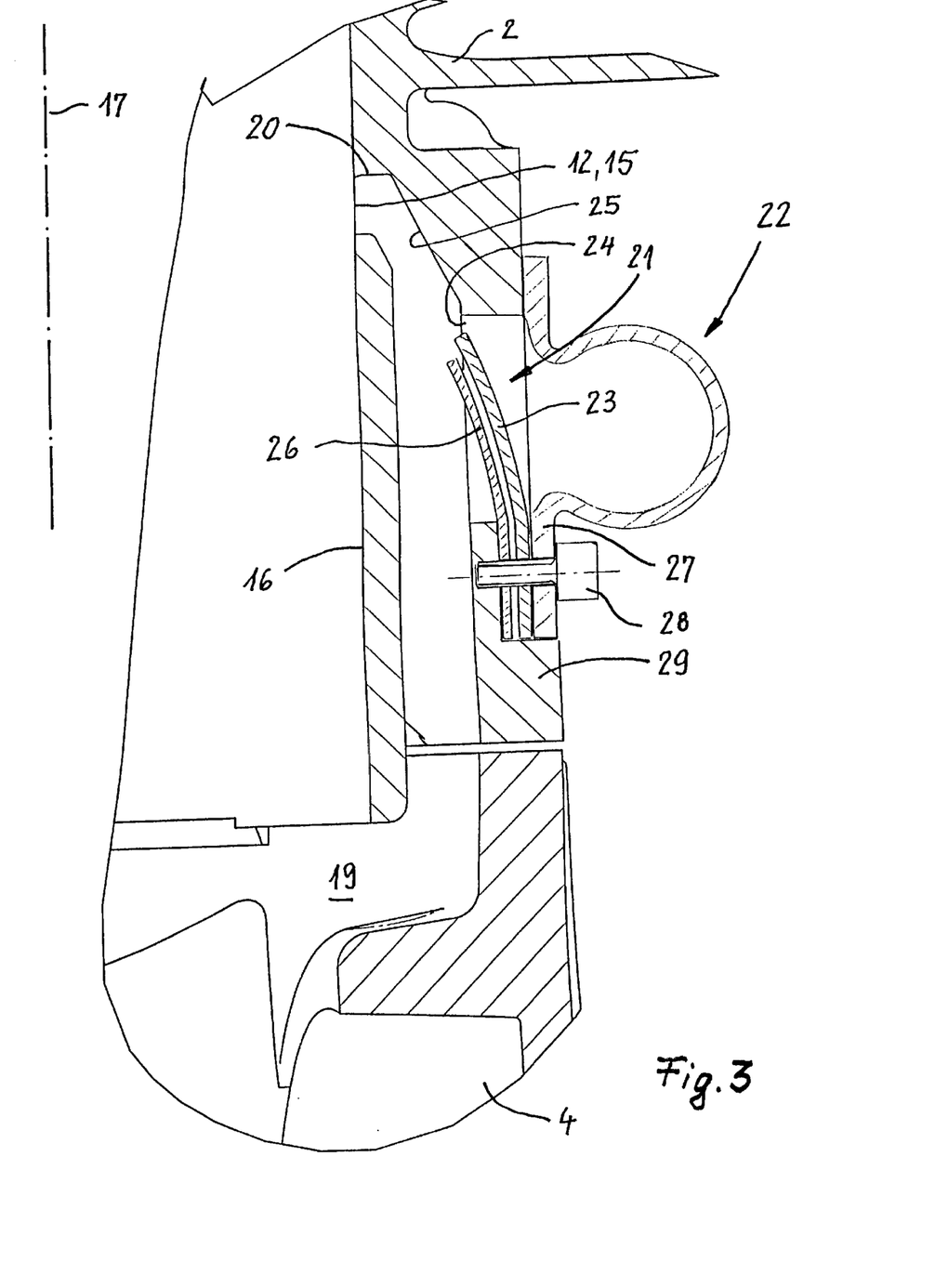
FIG. 3 is a detail view showing a longitudinal section through a transfer channel with the air channel connected thereto via a membrane valve; and, FIG. 4 is a schematic showing a cascade arrangement of the throttles of the air channel.

As shown especially in FIG. 3, in this embodiment, each transfer channel 14 runs in the cylinder wall 16 essentially parallel to the cylinder axis 17. The transfer channel 14 can, however, also have a configuration departing from the embodiment shown. Thus, the transfer channel can run curved in the flow direction.

As shown in FIGS. 2 and 3, the transfer channel 14, which is configured closed toward the piston, is connected to a preferably outer air channel (22a, 22b) between the first end 20 and the second end 19. A check valve 21 closes the flow connection between the air channel (22a, 22b) and the transfer channel 14 and opens into the transfer channel 14. In the embodiment shown, the check valve 21 is configured as a membrane valve. In the open position corresponding to FIG. 3, the membrane 23 clears an outlet slot 24 which faces toward the roof 25 of the transfer channel 14. In the open position shown, the membrane 23 is held by a sheet metal support 26 which, together with the connecting piece 27 of the air channel, is fixed to the outer cylinder wall 29 by an attachment screw 28.

In lieu of the membrane valve 21, the inflow of low-fuel air or fuel-free air is also advantageous via a slot-controlled window in the cylinder wall 16 and, if required, a peripheral slot in the piston skirt.

As shown in FIG. 2, four transfer channels 14 are provided in the embodiment and these channels lie on opposite-lying sides (47, 48) of the symmetry plane 49. The transfer channels 14 on side 47 are connected to gas-conducting air channel (22a, 22b), respectively, and the transfer channels 14 on side 48 are connected to gas-conducting air channel (22a, 22b), respectively. The air channels (22a, 22b) are configured as gas-conducting air channels separate from each other. Here, it is provided that the volumes of the essentially fuel-free gas flows (40, 41) can be adjusted differently from each other in the air channels (22a, 22b). For this purpose, a preferably adjustable throttle (31, 32) is assigned to each of the air channels (22a, 22b). As shown in the embodiment, it is practical to assign common, especially adjustable, throttles (31, 32) to the air channels (22a, 22b), respectively. These air channels (22a, 22b) open into the transfer channels 14 of a transfer pair. A transfer pair is formed by the transfer channels 14 which lie at approximately the same elevation on opposite-lying sides 47 and 48 of the symmetry plane 49.

The throttles (31, 32), which are assigned to corresponding ones of the air channels (22a, 22b) of a transfer pair, comprise a pivotable throttle element such as a cylinder and especially a throttle flap (33, 34) which is pivotally mounted in corresponding throttle housings (35, 36), respectively, about a rotational axis 37. The air channel 22a connects to the throttle housing 35 and the air channel 22b connects to the throttle housing 36. On the clean air side of an air filter 42, clean air is supplied to the transfer channels 14 via the throttle housings 35 and 36. The air channels 22 are configured as external pipes and/or tubing 22 as shown in the embodiment.

It can also be practical to configure the air channels by components forming the housing and/or cavities in the cylinder block. The air channels (22a, 22b) branch from the air filter housing 43. The air filter 42 functions to filter the combustion air supplied to the mixture-preparation device 8. The air filter housing 43 is mounted upstream of the mixture-preparation device 8 in the flow direction 38 of the inflowing combustion air. Advantageously, the clean space 60 of the air filter 42 is partitioned by a partition wall 61 into two chambers 62 and 63 separate from each other. The mixture-preparation device 8 is connected to one chamber 62; whereas, the other chamber 63 is connected via the throttles (31, 32) to the air channels (22a, 22b). In this way, a passing of fuel into the air channels is avoided.

As shown in FIG. 2, the throttle flap housings 35 and 36 are configured separate from each other as well as separate from the carburetor housing of the mixture-preparation device 8. The throttle housings 35 and 36 can be configured as a common housing component; however, throttle channels 44 and 45 are configured separately from each other for separately metering the volumes.

Figure 4:
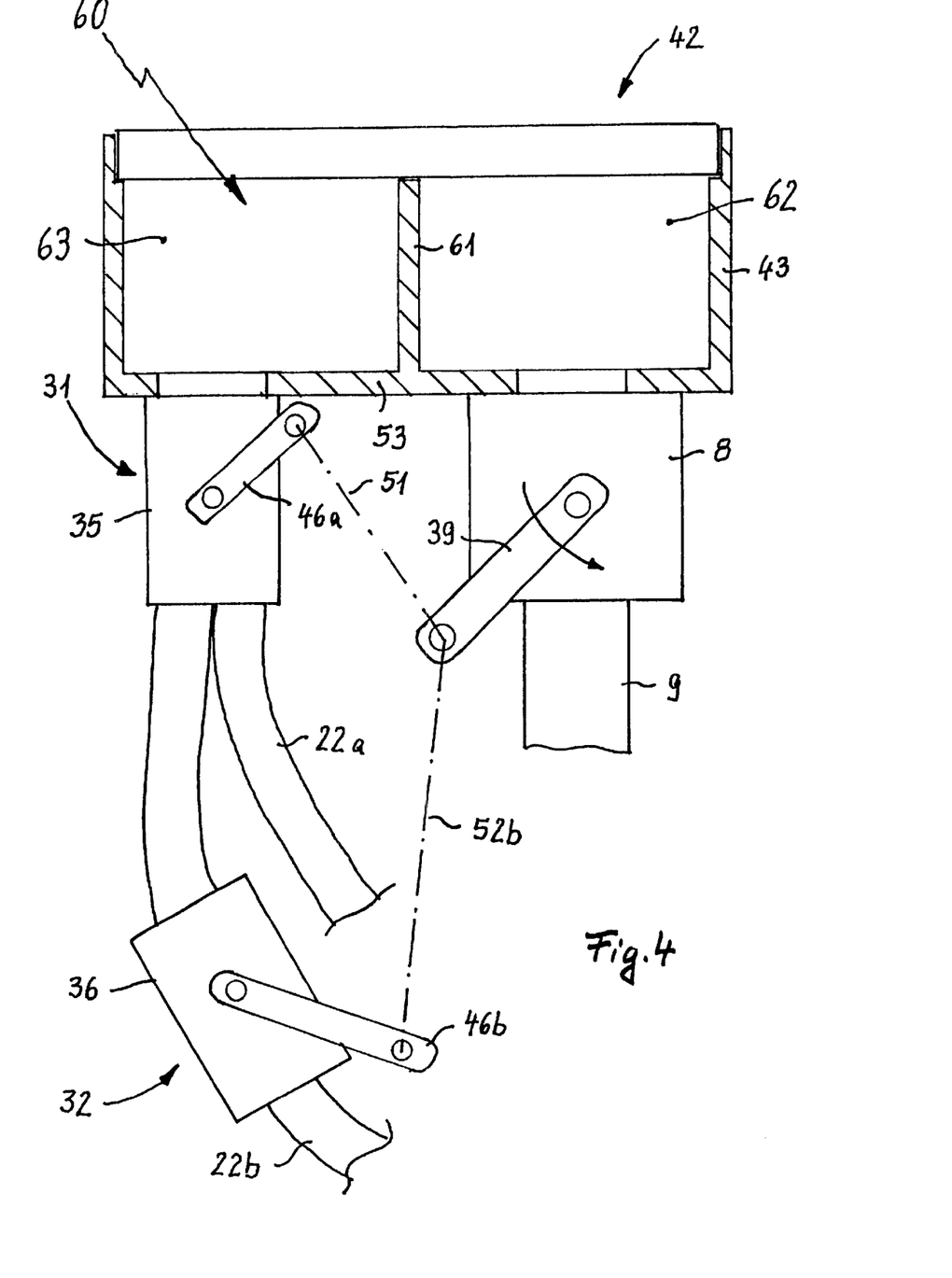

FIG. 4 shows a cascade arrangement with mutually separate throttles (31, 32). The throttle 31 is connected to the clean air chamber 63 of the air filter 42; whereas, the second throttle 32 is connected downstream of the first throttle 31 to the housing 35 thereof. The air channels 22a and 22b are, in turn, connected separately from each other to the throttles 31 and 32.

Each of the throttle elements or throttle flaps (33, 34) of the air channels (22a, 22b) is connected via a pivot shaft to a throttle flap lever (46a, 46b) so as not to rotate relative thereto and, via these throttle elements (33, 34), the opening widths (that is, the passthrough cross section) of the throttle channels 44 or 45 can be adjusted.

The throttle flaps 33 and 34 are position-dependently coupled to the throttle flap of the mixture-preparation device 8 or to its throttle flap pivot shaft 39. For this purpose, actuating arms 51, 52a and 52b are arranged between the throttle flap levers 39, 46a and 46b. The actuating arms 51, 52a and 52b are pivotably attached to corresponding ones of the throttle flap levers 39, 46a and 46b and switch these levers in series. Here, it is advantageous that each air throttle flap is coupled via an actuating arm (51, 52b) to the carburetor throttle flap or the air throttle flaps (33, 34) are connected in series one behind the other to the carburetor throttle flap via actuating arms 51 and 52a. With a rigid coupling of this kind, each position of the throttle flap in the carburetor is fixedly assigned a position of the throttle flap in the air-supplying throttle channels 44 and 45. The actuating arms 51 and 52 are adjustable with respect to their lengths, for example, by configuration as a threaded rod or the like to provide, individually, a suitable setting of the particular throttle flap 33 and 34 for the gassupplying air channels 22a and 22b.

Not only can the absolute position of the throttle flaps with respect to each other be influenced, but also the opening characteristics can be influenced by the configuration and length of the actuating arms (51, 52) as well as their pivot connection points on the levers (39, 46a, 46b). Additional configurations are possible by means of lost motion and cam discs. Accordingly, the opening of the air throttle can lag behind the opening of the carburetor throttle flap via lost motion. In this way, the possibility is provided to operate the same two-stroke engine 1 in accordance with the principle of advanced air as well as in accordance with the stratified charge principle.

For example, if the air supply into the air channels 22a, which open remote from the outlet, is essentially blocked and air is supplied, via the channels 22b, exclusively to the transfer channels 14, which are close to the outlet, then the two-stroke engine is operated in accordance with the principle of stratified charge. If the air supply via the air channels 22b, which are close to the outlet, is reduced by adjusting the throttle flap 34, then, during an induction phase, only a small amount of air can enter into the transfer channel 14 which is close to the outlet. For this reason, in the following charge exchange, first the advanced air flows in and thereafter at least a component quantity of the air/fuel mixture passes from the crankcase because of the overpressure, which builds up in the crankcase 4, and because of the follow-on flow of the air/fuel mixture. The charge principle of the engine shifts in the direction of the principle of advanced air.

If, in each induction phase, air is supplied to the transfer channels 14, which are close to the outlet, as well as to the transfer channels 14, which are remote from the outlet, then this air is supplied in all transfer channels 14 ahead of the follow-on air/fuel mixture. The two-stroke engine is then operated exclusively in accordance with the principle of advanced air.

The above exemplary descriptions of the different controls of the fluid (preferably air) supplied into the air channels 22a and 22b makes clear that the two-stroke engine can be operated in accordance with a stratified charge operation adapted to the particular operating point, for example, in dependence upon the load and/or the engine speed. In practice, the coupling of the throttle flap levers 39, 46a and 46b via correspondingly suitable actuating arms 51 and 52 takes place in such a manner that the kinematic, which results from this coupling, is adapted to the operating performance of the engine. Here, it can be practical to make the length L of the actuating arms (51, 52) adjustable so that the particular operating points can be corrected during service and maintenance.

Advantageously, the throttle flaps (33, 34) of the air throttles 31 and 32 are adjusted independently of each other via an electric actuating arrangement 55. The actuating arrangement 55 includes a control, such as a microprocessor, which detects operating data of the engine supplied via signal lines. The microprocessor evaluates these data and correspondingly activates the actuating device 55.

The throttle housings (35, 36) are advantageously fixed on the base 52 of the air filter 42. The throttle channels 44 and 45 branch out of the clean space 63 of the air filter housing 43. The throttle housings 35 and 36 can be configured as one part with the base 53 of the air filter.

The guidance of the air channels 22 from the throttle housings 35 and 36 to the transfer channels 14 can be separate as shown by the example of channels 22a or also can first be common as shown with channels 22b. The channels 22b divide only in the region of the cylinder. Also, the air channels can be configured constructively via housing-forming components or by cavities in the cylinder block.

It is understood that the foregoing description is that of the preferred embodiments of the invention and that various changes and modifications may be made thereto without departing from the spirit and scope of the invention as defined in the appended claims.

What is claimed is:

1. A two-stroke engine including a two-stroke engine in a portable handheld work apparatus, the two-stroke engine comprising:

a cylinder having a cylinder wall;

a piston mounted in said cylinder to undergo a reciprocating movement along a stroke path between top dead center and bottom dead center during operation of said engine;

said cylinder and said piston conjointly delimiting a combustion chamber;

a crankcase connected to said cylinder;

a crankshaft rotatably mounted in said crankcase;

a connecting rod connecting said piston to said crankshaft to permit said piston to drive said crankshaft as said piston reciprocates in said cylinder;

a mixture-preparation device for supplying an air/fuel mixture;

an intake channel for conducting said air/fuel mixture into said crankcase;

said cylinder having a discharge opening formed therein;

a plurality of transfer channels connecting said crankcase to said combustion chamber;

a first portion of said transfer channels being disposed on one side of a symmetry plane extending through said cylinder so as to partition said discharge outlet;

a second portion of said transfer channels disposed on the other side of said symmetry plane;

each of said transfer channels having a first end defining an entry window opening into said combustion chamber;

said entry window being formed in said cylinder wall and being controlled by said piston as said piston moves in said cylinder;

each of said transfer channels having a second end opening into said crankcase;

a first plurality of air channels connected to corresponding ones of said first portion of said transfer channels;

a second plurality of air channels connected to corresponding ones of said second portion of said transfer channels;

gas supply means for supplying a gas flow to each of said air channels;

said first plurality of air channels being configured separately from each other so that the volumes of the gas flows thereto can be adjusted differently;

said second plurality of air channels being configured separately from each other so that the volumes of the gas flows thereto can be adjusted differently;

a check valve for connecting each of said air channels to the transfer channel corresponding thereto at a location between said first and second ends thereof so as to permit the gas flow to flow from said air channel into the transfer channel; and, a throttle device connected to said air channels for effecting the different adjustment of the volumes of the gas flows in the separately configured air channels.

2. The two-stroke engine of claim 1, wherein said throttle device includes an adjustable throttle for each of said air channels.

3. A two-stroke engine including a two-stroke engine in a portable handheld work apparatus, the two-stroke engine comprising:

a cylinder having a cylinder wall;

a piston mounted in said cylinder to undergo a reciprocating movement along a stroke path between top dead center and bottom dead center during operation of said engine;

said cylinder and said piston conjointly delimiting a combustion chamber;

a crankcase connected to said cylinder;

a crankshaft rotatably mounted in said crankcase;

a connecting rod connecting said piston to said crankshaft to permit said piston to drive said crankshaft as said piston reciprocates in said cylinder;

a mixture-preparation device for supplying an air/fuel mixture;

an intake channel for conducting said air/fuel mixture into said crankcase;

said cylinder having a discharge opening formed therein;

a plurality of transfer channels connecting said crankcase to said combustion chamber;

a first portion of said transfer channels being disposed on one side of a symmetry plane extending through said cylinder so as to partition said discharge outlet;

a second portion of said transfer channels disposed on the other side of said symmetry plane;

each of said transfer channels having a first end defining an entry window opening into said combustion chamber;

said entry window being formed in said cylinder wall and being controlled by said piston as said piston moves in said cylinder;

each of said transfer channels having a second end opening into said crankcase;

a first plurality of air channels connected to corresponding ones of said first portion of transfer channels;

a second plurality of air channels connected to corresponding ones of said second portion of said transfer channels;

gas supply means for supplying a gas flow to each of said air channels;

said first plurality of air channels being configured separately from each other so that the volumes of the gas flows thereto can be adjusted differently;

said second plurality of air channels being configured separately from each other so that the volumes of the gas flows thereto can be adjusted differently;

a check valve for connecting each of said air channels to the transfer channel corresponding thereto at a location between said first and second ends thereof so as to permit the gas flow to flow from said air channel into the transfer channel;

a throttle device connected to said air channels for effecting the different adjustment of the volumes of the gas flows in the separately configured air channels;

a transfer channel of said first portion and a transfer channel of said second portion lying at approximately the same elevation and conjointly defining a transfer channel pair; and, said throttle device including a common adjustable throttle connected to the air channel of said first plurality and the air channel of said second plurality being connected to the corresponding ones of said transfer channels of said pair.

4. The two-stroke engine of claim 1, said throttle device including throttle elements for said air channels and said throttle elements being mounted for pivotal movement about a rotational axis.

5. The two-stroke engine of claim 4, wherein said throttle elements are throttle flaps.

6. The two-stroke engine of claim 4, wherein said mixture-preparation device includes a throttle flap; and, coupling means for position-dependently coupling said throttle elements to said throttle flap.

7. The two-stroke engine of claim 6, wherein said throttle elements are throttle flaps; and, said coupling means including levers attached to corresponding ones of said throttle flaps and actuating arms interconnecting said levers.

8. The two-stroke engine of claim 7, wherein said actuating arms are adjustable in length and translation ratios and/or lost motion are adjustable.

9. The two-stroke engine of claim 1, wherein said air channels are defined by at least one of the following: external pipes, tubing, components defining said air channels and cavities in the cylinder block.

10. The two-stroke engine of claim 1, further comprising an air filter mounted upstream of said mixture-preparation device; said air filter having an air filter housing having a base; said throttle device including a throttle housing connected to said base and said air channels being connected to said throttle housing; and, said throttle device including throttle elements mounted in said throttle housing for adjusting the gas flows to said air channels.

11. The two-stroke engine of claim 10, wherein said mixture-preparation device is a carburetor having a carburetor housing separate from said throttle housing and said carburetor housing is at a predetermined spacing from said throttle housing; and, said air channels are connected to said throttle housing separated one from the other.

12. A two-stroke engine including a two-stroke engine in a portable handheld work apparatus, the two-stroke engine comprising:

a cylinder having a cylinder wall;

a piston mounted in said cylinder to undergo a reciprocating movement along a stroke path between top dead center and bottom dead center during operation of said engine;

said cylinder and said piston conjointly delimiting a combustion chamber;

a crankcase connected to said cylinder;

a crankshaft rotatably mounted in said crankcase;

a connecting rod connecting said piston to said crankshaft to permit said piston to drive said crankshaft as said piston reciprocates in said cylinder;

a mixture-preparation device for supplying an air/fuel mixture;

an intake channel for conducting said air/fuel mixture into said crankcase;

said cylinder having a discharge opening formed therein;

a plurality of transfer channels connecting said crankcase to said combustion chamber;

a first portion of said transfer channels being disposed on one side of a symmetry plane extending through said cylinder so as to partition said discharge outlet;

a second portion of said transfer channels disposed on the other side of said symmetry plane;

each of said transfer channels having a first end defining an entry window opening into said combustion chamber;

said entry window being formed in said cylinder wall and being controlled by said piston as said piston moves in said cylinder;

each of said transfer channels having a second end opening into said crankcase;

a first plurality of air channels connected to corresponding ones of said first portion of transfer channels;

a second plurality of air channels connected to corresponding ones of said second portion of said transfer channels;

gas supply means for supplying a gas flow to each of said air channels;

said first plurality of air channels being configured separately from each other so that the volumes of the gas flows thereto can be adjusted differently;

said second plurality of air channels being configured separately from each other so that the volumes of the gas flows thereto can be adjusted differently;

a check valve for connecting each of said air channels to the transfer channel corresponding thereto at a location between said first and second ends thereof so as to permit the gas flow to flow from said air channel into the transfer channel;

a throttle device connected to said air channels for effecting the different adjustment of the volumes of the gas flows in the separately configured air channels;

an air filter mounted upstream of said mixture-preparation device;

said air filter having an air filter housing having a base; said throttle device including a throttle housing connected to said base and said air channels being connected to said throttle housing;

said throttle device including throttle elements mounted in said throttle housing for adjusting the gas flows to said air channels;

said mixture-preparation device being a carburetor having a carburetor housing separate from said throttle housing and said carburetor housing is at a predetermined spacing from said throttle housing;

said air channels being connected to said throttle housing separated one from the other;

said throttle device including a first throttle unit for a selected number of said air channels and a second throttle unit for the remainder of said air channels;

said first throttle unit being connected to said air filter housing and said second throttle unit being connected to said first throttle unit; and, said throttle units being accommodated in said throttle housing.

13. The two-stroke engine of claim 12, wherein said throttle housing is formed as one piece with said air filter base.

14. A two-stroke engine including a two-stroke engine in a portable handheld work apparatus, the two-stroke engine comprising:

a cylinder having a cylinder wall;

a piston mounted in said cylinder to undergo a reciprocating movement along a stroke path between top dead center and bottom dead center during operation of said engine;

said cylinder and said piston conjointly delimiting a combustion chamber;

a crankcase connected to said cylinder;

a crankshaft rotatably mounted in said crankcase;

a connecting rod connecting said piston to said crankshaft to permit said piston to drive said crankshaft as said piston reciprocates in said cylinder;

a mixture-preparation device for supplying an air/fuel mixture;

an intake channel for conducting said air/fuel mixture into said crankcase;

said cylinder having a discharge opening formed therein;

a plurality of transfer channels connecting said crankcase to said combustion chamber;

a first portion of said transfer channels being disposed on one side of a symmetry plane extending through said cylinder so as to partition said discharge outlet;

a second portion of said transfer channels disposed on the other side of said symmetry plane;

each of said transfer channels having a first end defining an entry window opening into said combustion chamber;

said entry window being formed in said cylinder wall and being controlled by said piston as said piston moves in said cylinder;

each of said transfer channels having a second end opening into said crankcase;

a first plurality of air channels connected to corresponding ones of said first portion of transfer channels;

a second plurality of air channels connected to corresponding ones of said second portion of said transfer channels;

gas supply means for supplying a gas flow to each of said air channels;

said first plurality of air channels being configured separately from each other so that the volumes of the gas flows thereto can be adjusted differently;

said second plurality of air channels being configured separately from each other so that the volumes of the gas flows thereto can be adjusted differently;

a check valve for connecting each of said air channels to the transfer channel corresponding thereto at a location between said first and second ends thereof so as to permit the gas flow to flow from said air channel into the transfer channel;

a throttle device connected to said air channels for effecting the different adjustment of the volumes of the gas flows in the separately configured air channels;

an air filter mounted upstream of said mixture-preparation device;

said air filter having an air filter housing having a base;

said throttle device including a throttle housing connected to said base and said air channels being connected to said throttle housing;

said throttle device including throttle elements mounted in said throttle housing for adjusting the gas flows to said air channels;

said air filter housing defining a clean space and including a partition wall partitioning said clean space into two chambers separated from each other; and, said mixture-preparation device being connected to one of said chambers and said throttle device being connected to the other one of said chambers.

15. The two-stroke engine of claim 12, further comprising an electrical positioning device adjusting said first and second throttle units independently of each other.

16. The two-stroke engine of claim 1, wherein said gas supply means supplies a gas flow of fuel-free air or essentially fuel-free air to each of said air channels.

\* \* \* \* \*